US010600419B1

(12) United States Patent
Sarikaya et al.

(10) Patent No.: US 10,600,419 B1
(45) Date of Patent: Mar. 24, 2020

(54) SYSTEM COMMAND PROCESSING

(71) Applicant: Amazon Technologies, Inc., Seattle, WA (US)

(72) Inventors: Ruhi Sarikaya, Redmond, WA (US); Rohit Prasad, Lexington, MA (US); Kerry Hammil, Seattle, WA (US); Spyridon Matsoukas, Hopkinton, MA (US); Nikko Strom, Kirkland, WA (US); Frédéric Johan Georges Deramat, Seattle, WA (US); Stephen Frederick Potter, Seattle, WA (US); Young-Bum Kim, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 115 days.

(21) Appl. No.: 15/712,676

(22) Filed: Sep. 22, 2017

(51) Int. Cl.
*G10L 15/22* (2006.01)
*G10L 15/34* (2013.01)
(Continued)

(52) U.S. Cl.
CPC .............. *G10L 15/34* (2013.01); *G06F 17/21* (2013.01); *G06F 17/27* (2013.01)

(58) Field of Classification Search
CPC ....... G10L 15/22; G10L 15/183; G10L 15/08; G10L 15/1815; G10L 2015/088; G10L 15/30; G10L 2015/223; G10L 15/18; G10L 2015/0635; G10L 15/02; G10L 15/065; G10L 15/10; G10L 15/12; G10L 15/265; G10L 2015/0638; G10L 2015/225; G10L 15/14; G10L 15/1822; G10L 15/32;
(Continued)

(56) References Cited

U.S. PATENT DOCUMENTS 6,785,651 B1   8/2004 Wang
7,418,392 B1   8/2008 Mozer et al.
(Continued)

OTHER PUBLICATIONS

The Examiner's attention is hereby drawn to the specification and file history of co-pending U.S. Appl. No. 15/821,080, titled "System Command Processing", filed Nov. 22, 2017, which many contain information relevant to the present application.

(Continued)

*Primary Examiner* — Abdelali Serrou
(74) *Attorney, Agent, or Firm* — Pierce Atwood LLP

(57) ABSTRACT

Techniques for performing command processing are described. A system receives, from a device, input data corresponding to a command. The system determines NLU processing results associated with multiple applications. The system also determines NLU confidences for the NLU processing results for each application. The system sends NLU processing results to a portion of the multiple applications, and receives output data or instructions from the portion of the applications. The system ranks the portion of the applications based at least in part on the NLU processing results associated with the portion of the applications as well as the output data or instructions provided by the portion of the applications. The system may also rank the portion of the applications using other data. The system causes content corresponding to output data or instructions provided by the highest ranked application to be output to a user.

20 Claims, 9 Drawing Sheets

(51) Int. Cl.
*G06F 17/21* (2006.01)
*G06F 17/27* (2006.01)

(58) Field of Classification Search
CPC . G10L 2015/228; G10L 15/063; G10L 15/24; G10L 15/00; G10L 15/34; G10L 15/005; G10L 15/01; G10L 15/07; G10L 15/142; G10L 15/193; G10L 15/197; G10L 2015/221; G10L 2015/227; G10L 2021/02082; G10L 21/0232; G10L 25/30; G10L 25/51; G06F 17/2785; G06F 3/167; G06F 16/3329; G06F 17/279; G06F 16/33; G06F 16/3344; G06F 16/90332; G06F 17/20; G06F 17/27; G06F 17/271; G06F 17/2715; G06F 9/451; G06F 9/4843; G06F 9/4881; G06F 9/5083
See application file for complete search history.

(56) References Cited

U.S. PATENT DOCUMENTS

| | | | | |
|---|---|---|---|---|
| 7,720,683 | B1* | 5/2010 | Vermeulen | G10L 15/22 704/235 |
| 8,082,153 | B2* | 12/2011 | Coffman | G10L 15/22 704/270 |
| 9,361,084 | B1* | 6/2016 | Costa | G06F 8/61 |
| 9,424,840 | B1 | 8/2016 | Hart et al. | |
| 10,235,997 | B2 | 3/2019 | Shah et al. | |
| 2003/0139925 | A1* | 7/2003 | Anderson | G10L 15/065 704/231 |
| 2004/0085162 | A1 | 5/2004 | Agarwal et al. | |
| 2006/0116877 | A1 | 6/2006 | Pickering et al. | |
| 2006/0149558 | A1* | 7/2006 | Kahn | G10L 15/063 704/278 |
| 2007/0143099 | A1* | 6/2007 | Balchandran | G10L 15/18 704/9 |
| 2010/0106497 | A1 | 4/2010 | Phillips | |
| 2010/0223060 | A1* | 9/2010 | Chang | G10L 15/22 704/272 |
| 2011/0202936 | A1* | 8/2011 | Todoroki | G06F 3/0481 719/329 |
| 2012/0296638 | A1 | 11/2012 | Patwa | |
| 2013/0152092 | A1 | 6/2013 | Yadgar | |
| 2013/0166543 | A1 | 6/2013 | MacDonald et al. | |
| 2013/0275164 | A1 | 10/2013 | Gruber et al. | |
| 2013/0339021 | A1 | 12/2013 | Deshmukh et al. | |
| 2014/0019873 | A1* | 1/2014 | Gupta | H04L 67/36 715/744 |
| 2014/0278424 | A1* | 9/2014 | Deng | G10L 15/063 704/257 |
| 2015/0286747 | A1* | 10/2015 | Anastasakos | G06F 16/9017 707/776 |
| 2016/0042748 | A1* | 2/2016 | Jain | G10L 25/48 704/9 |
| 2016/0163311 | A1* | 6/2016 | Crook | G10L 15/183 704/275 |
| 2016/0180853 | A1* | 6/2016 | VanLund | G10L 17/22 704/275 |
| 2016/0196499 | A1* | 7/2016 | Khan | G06N 5/048 706/52 |
| 2017/0236512 | A1* | 8/2017 | Williams | G06F 16/68 381/79 |
| 2017/0263255 | A1* | 9/2017 | Jeong | G10L 15/183 |
| 2019/0163311 | A1* | 5/2019 | Kong | G06F 3/0416 |

OTHER PUBLICATIONS

Office Action dated Jul. 10, 2019 in U.S. Appl. No. 15/821,080.
Office Action dated Dec. 10, 2019 in U.S. Appl. No. 15/821,080, filed Nov. 22, 2017.

* cited by examiner

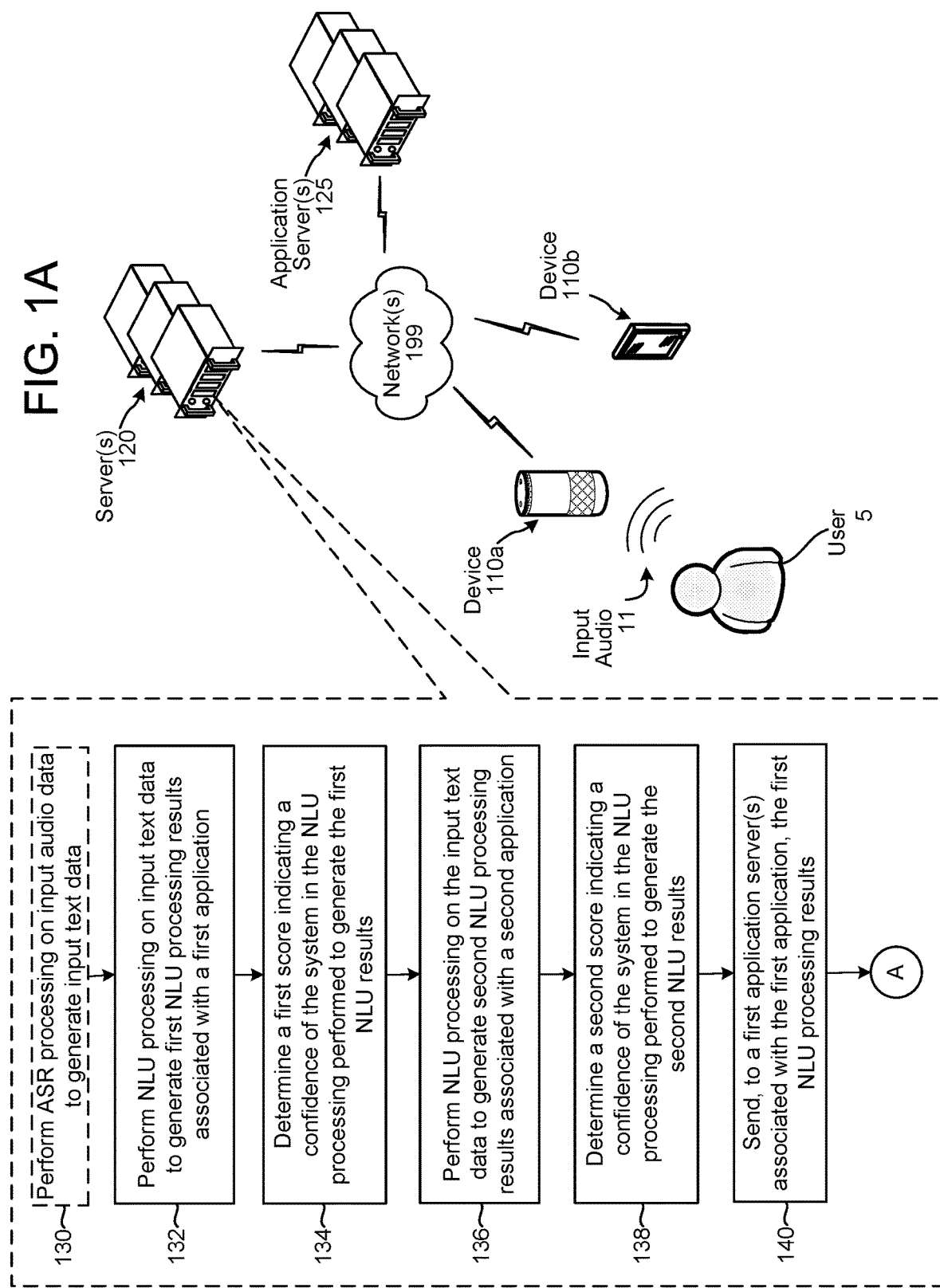

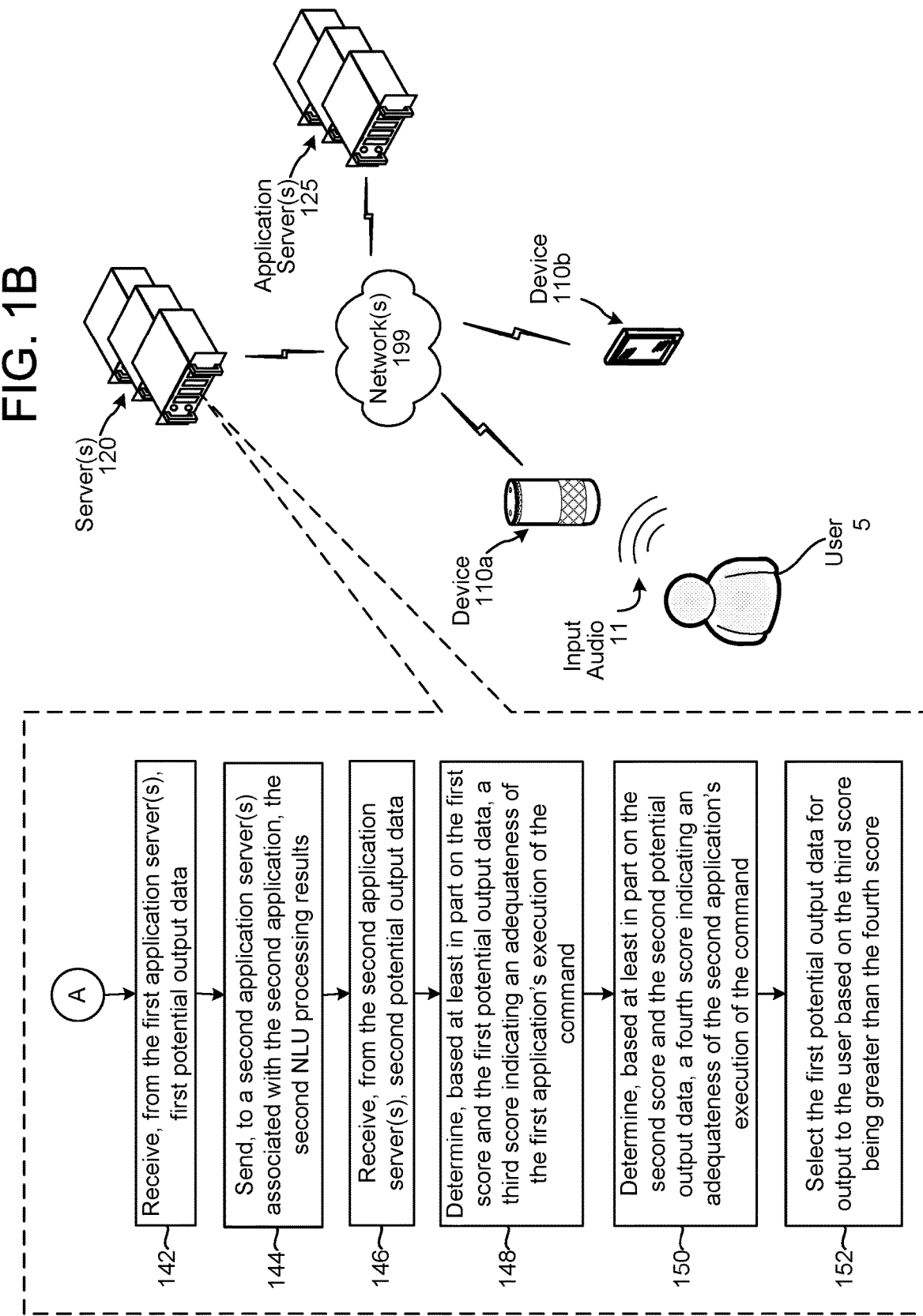

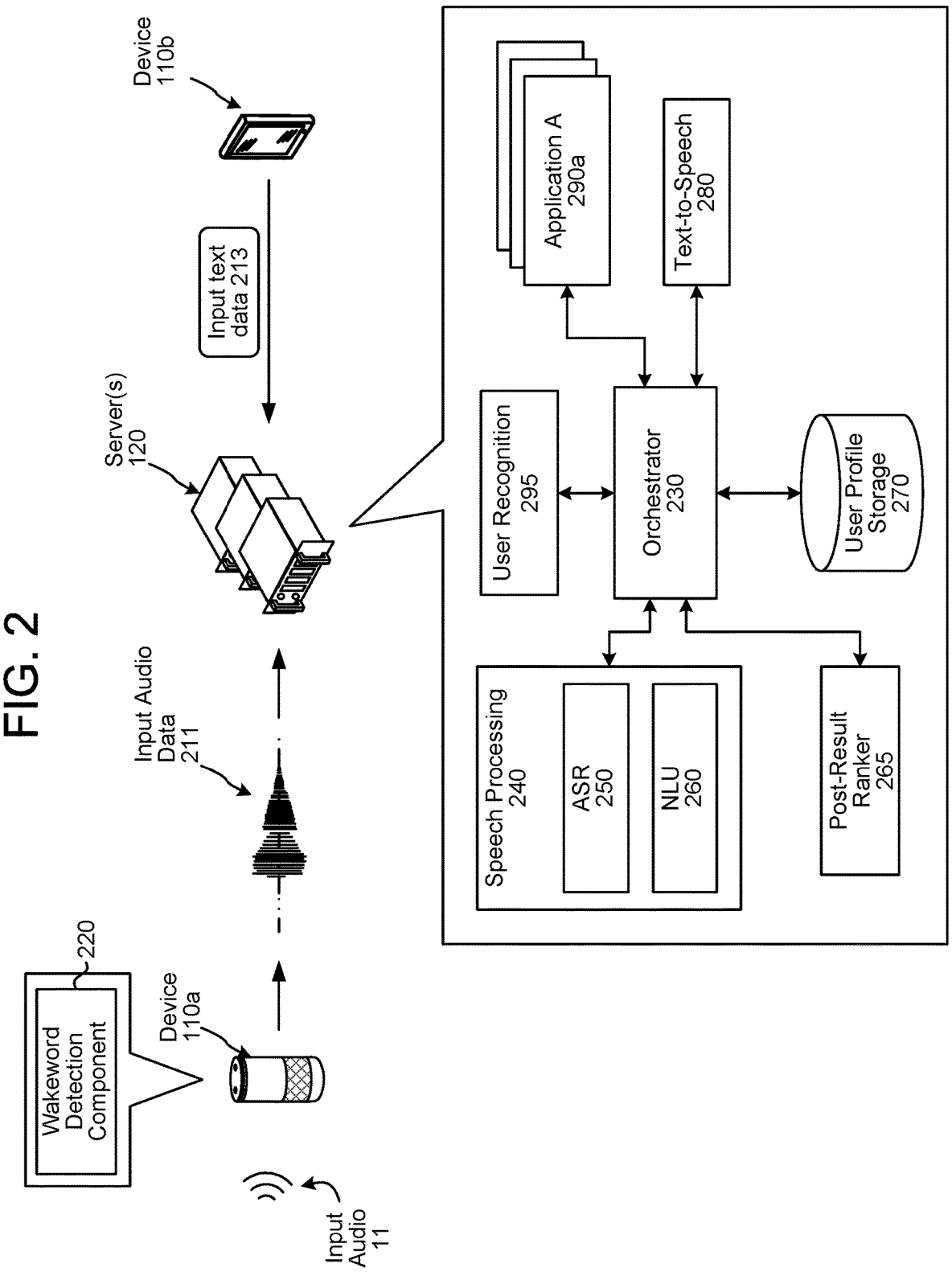

SYSTEM COMMAND PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system configured to perform speech processing according to embodiments of the present disclosure.

FIG. 2 is a conceptual diagram of components of a system according to embodiments of the present disclosure.

DETAILED DESCRIPTION

Figure 3:
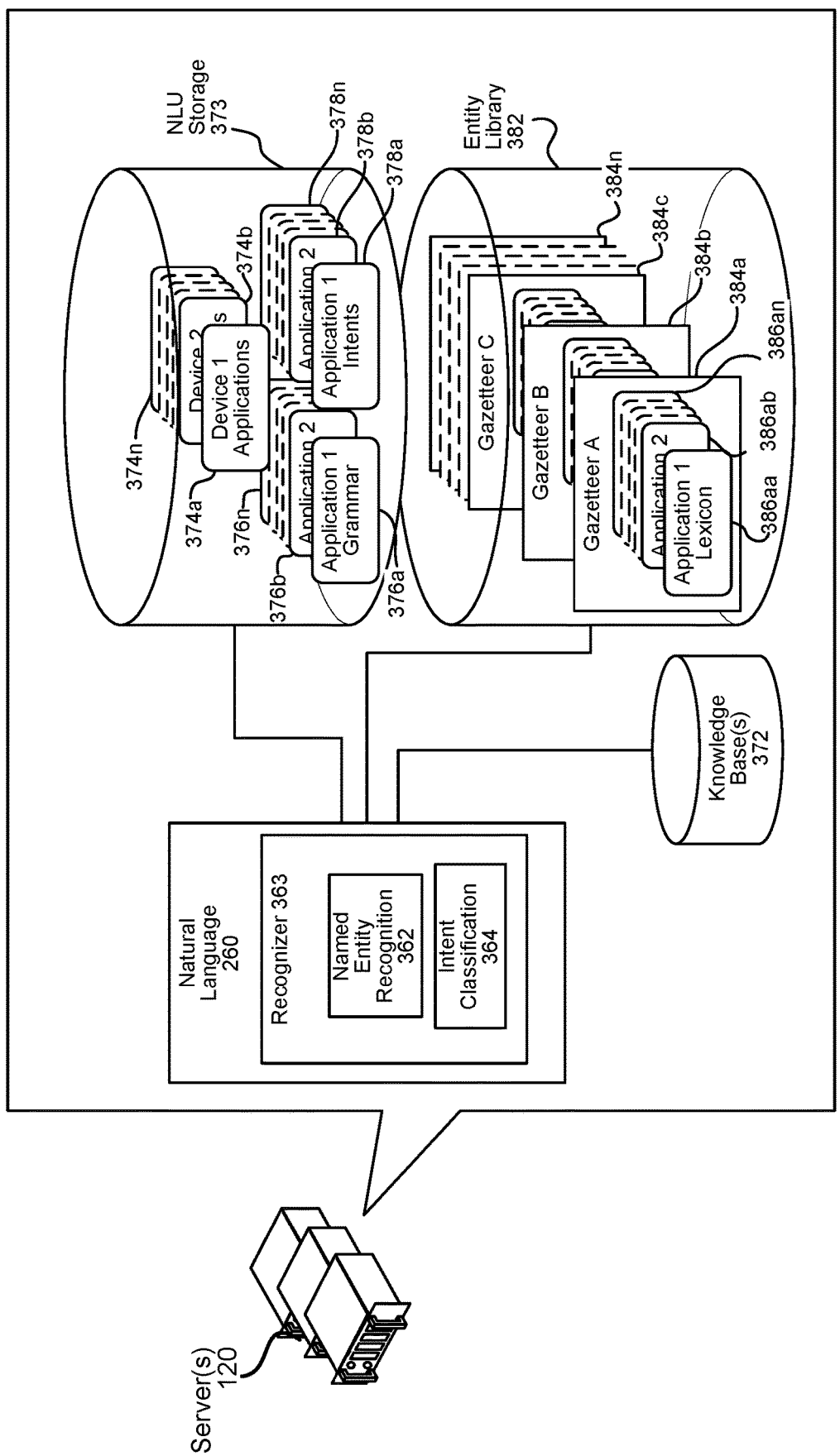
FIG. 3 is a conceptual diagram of how natural language processing is performed according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may answer user commands requesting the output of content. For example, a user may say "Alexa, what is the weather." In response, the system may output weather information. For further example, a user may say "Alexa, play Adele." In response, the system may output music sang by Adele.

The system may be configured with multiple applications (e.g., thousands of applications) that can be used to potentially respond to a user command. For example, the system may include weather applications, music applications, video applications, calendar applications, timer applications, general knowledge answering applications, game applications, etc. Further, the system may be capable of operating many different applications that have an overlapping subject matter. For example, the system may include more than one application that can execute commands related to requests for weather information. For further example, the system may include one or more medical information applications that execute commands requesting medical information. Determining which application should be selected to handle an incoming user command is a non-trivial problem.

The system may determine, in parallel, which of the entirety of the system's applications may potentially execute a given command. For example, when the system receives a command, the system may determine, for each application, the portions of the command that may be relevant to the application's execution of the command as well as one or more intents related to the particular application to which the command potentially relates.

The system may generate, for each application, a probability indicating a likelihood that the application can execute the command. Based on the probabilities assigned to multiple applications of the system, the system may select a single application from which to obtain output content responsive to the command.

In some situations, multiple applications may be associated with similar probability scores even though some of the applications may not be able to execute the command. The system may select an application to obtain output content from even though the application may not be able to provide output content responsive to the command. In certain systems, the selection of a single application to actually execute the application is made prior to actually obtaining the output data from the selected application. This is due to a number of different reasons including latency, conservation of computing resources, etc.

The present disclosure improves speech controlled computing systems by incorporating the respective applications' potential results when disambiguating which application to select for responding to the user's command. Thus the system may increase the likelihood that the system will select the appropriate application than can provide output content most responsive to an input command. That is, prior to selecting a particular application from which to obtain output content that will be sent to the user, the system actually sends NLU results to a number of different applications and obtains from those applications at least partial command-related output. The system can then consider that command-related output to determine post-results scores for the respective applications and then use those post-results scores to select from among the applications to actually respond to the input command.

A system according to the present disclosure sends requests for output content to multiple applications that may execute a command. Based on the respective results provided in response to the requests, the system alters the original probabilities generated for the applications and/or creates new probabilities that correspond to how closely the applications match the input command. The system may then select content generated from the application with the highest probability for output to a user. The teachings of the present disclosure may allow a system to reduce the number of situations in which a system calls on an application to execute a command and the application returns inadequate results or no results at all.

FIGS. 1A-1B illustrate a system for performing speech processing with respect to an input command. Although the figures and discussion illustrate certain operational steps of the system in a particular order, the steps described may be performed in a different order (as well as certain steps removed or added) without departing from the intent of the disclosure. Devices (110a/110b) local to a user 5, one or more server(s) 120, and one or more application servers 125 may communicate across one or more networks 199.

The device 110a may receive input audio 11 corresponding to a spoken utterance originating from the user 5. The device 110a generates input audio data corresponding to the input audio 11 and sends the input audio data to the server(s) 120.

Alternatively, the device 110b may receive input from the user 5 corresponding to text via a touch screen providing a virtual keyboard. The device 110b may generate input text data corresponding to the input text. The device 110b may send the input text data to the server(s) 120 via a companion application operating on the device 110b and in communication with the server(s) 120.

If the server(s) 120 receives input audio data from the device 110a, the server(s) 120 performs (130) automatic speech recognition (ASR) processing on the input audio data to generate input text data.

The server(s) 120 performs natural language understanding (NLU) processing on input text data (i.e., received from the device 110b or generated by performing ASR processing on input audio data received from the device 110a) with respect to multiple applications of the system. The server(s) 120 may perform (132) NLU processing on the input text data to generate first NLU results associated with a first application. The server(s) 120 determines (134) a first score indicating a confidence of the system in the NLU processing performed to generate the first NLU results. The server(s) 120 may also perform (136) NLU processing on the input text data to generate second NLU processing results associated with a second application. The server(s) 120 determines (138) a second score indicating a confidence of the system in the NLU processing performed to generate the second NLU results.

The server(s) 120 sends (140) the first NLU processing results to a first application server(s) associated with the first application. The server(s) 120 receives (142) first potential output data, corresponding to first potential output content, from the first application server(s). The server(s) 120 also sends (144) the second NLU processing results to a second application server(s) associated with the second application. The server(s) 120 receives (146) second potential output data, corresponding to second potential output content from the second application server(s).

The server(s) 120 determines (148) a third score indicating an adequateness of the first application's execution of the command based at least in part on the first score and the first potential output data. The server(s) 120 also determines (150) a fourth score indicating an adequateness of the second application's execution of the command based at least in part on the second score and the second potential output data. A difference between the third probability and the fourth probability may be greater than a difference between the first probability and the second probability.

The server(s) 120 selects (152) the first potential output data for output to the user 5 based on the third score being greater than the fourth score. The server(s) 120 sends the first potential output data to the device 110a and/or the device 110b. The device 110a and/or the device 110b outputs content corresponding to the first potential output data to the user 5.

The system may operate using various components as described in FIG. 2. The various components may be located on a same or different physical devices. Communication between various components may occur directly or across a network(s) 199.

The device 110a may receive input audio 11, corresponding to a spoken utterance corresponding at least in part to a command, using an audio capture component, such as a microphone or array of microphones. The device 110a, using a wakeword detection component 220, processes audio data corresponding to the input audio 11 to determine if a keyword (e.g., a wakeword) is detected in the audio data. Following detection of a wakeword, the device 110a sends input audio data 211, corresponding to the utterance, to the server(s) 120.

Upon receipt by the server(s) 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The ASR component 250 interprets the utterance in the input audio data 211 based on a similarity between the utterance and pre-established language models. For example, the ASR component 250 may compare the input audio data 211 with models for sounds (e.g., subword units, such as phonemes, etc.) and sequences of sounds to identify words that match the sequence of sounds spoken in the utterance represented in the input audio data 211. The ASR component 250 sends the input text data generated thereby to a NLU component 260 of the speech processing component 260. The input text data sent from the ASR component 250 to the NLU component 260 may include a top scoring hypothesis or may include an N-best list including multiple hypotheses. An N-best list may additionally include a score associated with each hypothesis represented therein. Each score may indicate a confidence of ASR processing performed with respect to the hypothesis with which it is associated.

Alternatively, the device 110b may send input text data 213 to the server(s) 120. Upon receipt by the server(s) 120, the input text data 213 may be sent to the orchestrator component 230. The orchestrator component 230 may send the input text data 213 to the NLU component 260.

The NLU component 260 attempts to make a semantic interpretation of the phrases or statements represented in the input text data input therein. That is, the NLU component 260 determines one or more meanings associated with the phrases or statements represented in the input text data based on individual words represented in the input text data. The NLU component 260 determines an intent of a command represented in the input text data (e.g., an action that a user desires be performed) as well as pertinent pieces of information in the input text data that allow a device (e.g., the device 110a, the device 110b, the server(s) 120, the application server(s) 125, etc.) to execute the intent. For example, if the input text data corresponds to "call mom," the NLU component 260 may determine a user intended to activate a telephone in his/her device and to initiate a call with a contact matching the entity "mom."

The system may include a post-result ranker component 265 that selects which application's output data to send to the user. The post-result ranker component 265 is described in further detail below.

The server(s) 120 may include a user recognition component 295. The user recognition component 295 may take as input the input audio data 211 and/or input text data output by the ASR component 250. The user recognition component 295 determines scores indicating whether the command originated from a particular user. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing speech characteristics in the input audio data 211 to stored speech characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform NLU component processes as well as processing performed by applications 290.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer identifier (ID). A customer profile may be an umbrella profile specific to a group of users. That is, a customer profile encompasses two or more individual user profiles, each associated with a respective unique user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199.

FIG. 2 illustrates various 1P applications 290 (e.g., applications maintained and/or operated by the server(s) 120). However, it should be appreciated that the server(s) 120 may additionally or alternatively communicate with one or more application servers 125 executing 3P applications.

An "application," as used herein, may be considered synonymous with a "skill." A skill may be software running on an application server(s) 125 that enables the application server(s) 125 to implement certain functionality to provide data or produce some other output requested by a user. The system may be configured with more than one skill. For example, a weather skill may enable an application server(s) 125 to provide the server(s) 120 with weather information, a car service skill may enable an application server(s) 125 to book a taxi or ride sharing ride and provide the server(s) 120 with information representing same, an order pizza skill may enable an application server(s) 125 to place a pizza order and provide the server(s) 120 with information representing same, etc.

The system may also be configured with different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

An application server(s) 125 implementing a skill may provide the server(s) 120 with data indicating one or more intents that represent actions that the skill can perform for users. For example, a weather skill may be associated with a <GetWeather> intent that enables the weather skill to provide weather information, a car service skill may be associated with a <BookRide> intent that enables the care service skill to book a taxi or ride sharing ride, an order pizza skill may be associated with a <OrderPizza> intent that enables the order pizza skill to place a pizza order via an API of a pizzeria's system, etc. An application server(s) 125 implementing a skill may also provide the server(s) 120 with data indicating sample utterance that specify word and phrases users can say to invoke the skill's intent(s).

The server(s) 120 may include a text-to-speech (TTS) component 280 that generates audio data from text data using one or more different methods. In one method of synthesis called unit selection, the text-to-speech component 280 matches text data against a database of recorded speech. The text-to-speech component 280 selects matching units of recorded speech matching the text data and concatenates the units together to form output audio data. In another method of synthesis called parametric synthesis, the text-to-speech component 280 varies parameters such as frequency, volume, and noise to create output audio data including an artificial speech waveform. Parametric synthesis uses a computerized voice generator, sometimes called a vocoder.

FIG. 3 illustrates how NLU processing is performed on input text data. Generally, the NLU component 360 attempts to make a semantic interpretation of text represented in text data input thereto. That is, the NLU component 360 determines the meaning behind text represented in text data based on the individual words and/or phrases. The NLU component 360 interprets text to derive an intent or a desired action from the user as well as the pertinent pieces of information in the text that allow a device (e.g., the device 110a, the device 110b, the server(s) 120, the application server(s) 125) to complete that action. For example, if the NLU component 260 receives text data including text corresponding to "tell me the weather," the NLU component 260 may determine that the user intends the system to output weather information.

The NLU component 260 may process text data including several hypotheses of a single utterance. For example, if the ASR component 250 outputs text data including an N-best list of hypotheses, the NLU component 260 may process the text data with respect to all (or a portion of) the hypotheses represented therein.

The NLU component 260 may annotate text represented in text data by parsing and/or tagging the text. For example, for the text "tell me the weather for Seattle," the NLU component 260 may tag "tell me the weather for Seattle" as a command (e.g., to output weather information) as well as tag "Seattle" as a location for the weather information.

The NLU component 260 may include one or more recognizers 363. Each recognizer 363 may be associated with a different application 290. Each recognizer 363 may process with respect to text data input to the NLU component 260. Each recognizer 363 may operate in parallel with other recognizers 363 of the NLU component 260.

Each recognizer 363 may include a named entity recognition (NER) component 362. The NER component 362 attempts to identify grammars and lexical information that may be used to construe meaning with respect to text represented in text data input therein. The NER component 362 identifies portions of text represented in text data input into the NLU component 260 that correspond to a named entity that may be applicable to processing performed by an application associated with the recognizer 363 implementing the NER component 362. The NER component 362 (or other component of the NLU component 260) may also determine whether a word refers to an entity that is not explicitly mentioned in the text, for example "him," "her," "it" or other anaphora, exophora or the like.

Each recognizer 363, and more specifically each NER component 362, may be associated with a particular grammar model and/or database 376, a particular set of intents/actions 378, and a particular personalized lexicon 386. Each gazetteer 384 may include application-indexed lexical information associated with a particular user and/or device. For example, a Gazetteer A (384a) includes application-index lexical information 386aa to 386an. A user's music application lexical information might include album titles, artist names, and song names, for example, whereas a user's contact list application lexical information might include the names of contacts. Since every user's music collection and contact list is presumably different, this personalized information improves entity resolution.

An NER component 362 applies grammar models 376 and lexical information 386 associated with the application (associated with the recognizer 363 implementing the NER component 362) to determine a mention of one or more entities in text data input therein. In this manner, the NER component 362 identifies "slots" (i.e., one or more particular words in text data) that may be needed for later command processing. The NER component 362 may also label each slot with a type (e.g., noun, place, city, artist name, song name, etc.).

Each grammar model 376 includes the names of entities (i.e., nouns) commonly found in speech about the particular application (i.e., generic terms) to which the grammar model 376 relates, whereas the lexical information 386 is personalized to the user and/or the device from which the input audio data 211 or input text data 213 originated. For example, a grammar model 376 associated with a shopping application may include a database of words commonly used when people discuss shopping.

A downstream process called named entity resolution actually links a portion of text data to an actual specific entity known to the system. To perform named entity resolution, the NLU component 260 may utilize gazetteer information (384a-384n) stored in an entity library storage 382. The gazetteer information 384 may be used to match text represented in text data output by the ASR component 250 with different entities, such as song titles, contact names, etc. Gazetteers may be linked to users (e.g., a particular gazetteer may be associated with a specific user's music collection), may be linked to certain applications (e.g., a shopping application, a music application, a video application, a communications application, etc.), or may be organized in a variety of other ways.

Each recognizer 363 may also include an intent classification (IC) component 364. The IC component 364 parses text data input thereto to determine an intent(s) associated with the application (associated with the recognizer 363 implementing the IC component 364) that potentially corresponds to the command represented in the text data. An intent corresponds to an action to be performed that is responsive to the command represented by the text data. The IC component 364 may communicate with a database 378 of words linked to intents. For example, a music intent database may link words and phrases such as "quiet," "volume off," and "mute" to a "mute" intent. The IC component 364 identifies potential intents by comparing words and phrases in input text data to the words and phrases in an intents database 378 associated with the application that is associated with the recognizer 363 implementing the IC component 364.

The intents identifiable by a specific IC component 364 are linked to application-specific (i.e., the application associated with the recognizer 363 implementing the IC component 364) grammar frameworks 376 with "slots" to be filled. Each slot of a grammar framework 376 corresponds to a portion of the text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the application associated with the recognizer 363 implementing the NER component 362, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music application recognizer 363 may parse and tag text data including text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music application, which an IC component 364 (also implemented by the music application recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the hypothesis represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the application (in the knowledge base 372). For example, if the text data includes text corresponding to "play songs by the rolling stones," after failing to determine an album name or song name called "songs" by "the rolling stones," the NER component 362 may search the application vocabulary for the word "songs." In the alternative, generic words may be checked before the gazetteer information, or both may be tried, potentially producing two different results.

An NER component 362 may tag text of a hypothesis represented in text data to attribute meaning to the hypothesis. For example, an NER component 362 may tag "play mother's little helper by the rolling stones" as: {application} Music, {intent} Play Music, {artist name} rolling stones, {media type} SONG, and {song title} mother's little helper. For further example, the NER component 362 may tag "play songs by the rolling stones" as: {application} Music, {intent} Play Music, {artist name} rolling stones, and {media type} SONG.

Figure 4:
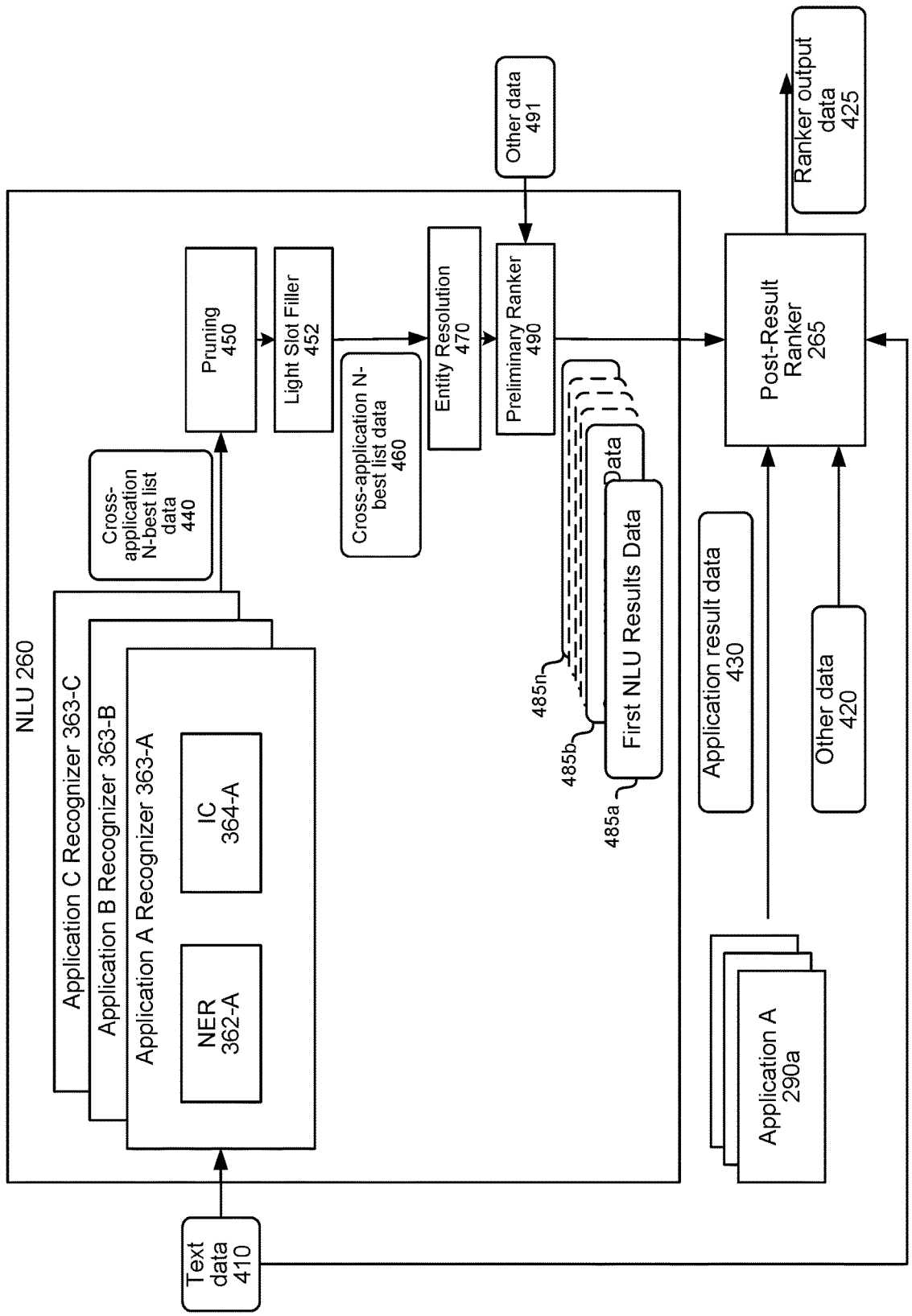
FIG. 4 is a conceptual diagram of how natural language processing is performed according to embodiments of the present disclosure.

The NLU component 260 may generate cross-application N-best list data 440 including the tagged text output by each recognizer 363 (as illustrated if FIG. 4). A recognizer 363 may output tagged text data generated by an NER component 362 and an IC component 364 operated by the recognizer 363, as described herein above. Each entry of tagged text represented in the cross-application N-best list data 440 may be associated with a respective score indicating a likelihood that the tagged text corresponds to the application 290 associated with the recognizer 363 from which the tagged text was output. For example, the cross-application N-best list data 440 may be represented as:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-application N-best list data 440 to a pruning component 450. The pruning component 450 may sort the tagged text represented in the cross-application N-best list data 440 according to their respective scores. The pruning component 450 may then perform score thresholding with respect to the cross-application N-best list data 440. For example, the pruning component 450 may select tagged text represented in the cross-application N-best list data 440 associated with a score satisfying (e.g., meeting and/or exceeding) a threshold score. The pruning component 450 may also or alternatively perform number of tagged text entry thresholding. For example, the pruning component 450 may select a maximum threshold number of top scoring tagged text entries. The pruning component 450 may generate cross-application N-best list data 460 including the selected tagged text entries. The purpose of the pruning component 450 is to create a reduced list of tagged text entries so that downstream, more resource intensive, processes may only operate on the tagged text entries that most likely correspond to the command input to the system.

The NLU component 260 may also include a light slot filler component 452. The light slot filler component 452 can take text from slots represented in the tagged text entries output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream system components. For example, if a tagged text entry includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-application N-best list data 460.

The NLU component 260 sends the cross-application N-best list data 460 to an entity resolution component 470. The entity resolution component 470 can apply rules or other instructions to standardize labels or tokens from previous stages into an intent/slot representation. The precise transformation may depend on the application. For example, for a travel application, the entity resolution component 470 may transform text corresponding to "Boston airport" to the standard BOS three-letter code referring to the airport. The entity resolution component 470 can refer to a knowledge base that is used to specifically identify the precise entity referred to in each slot of each tagged text entry represented in the cross-application N-best list data 460. Specific intent/slot combinations may also be tied to a particular source, which may then be used to resolve the text. In the example "play songs by the stones," the entity resolution component 470 may reference a personal music catalog, Amazon Music account, a user profile 502 (described herein), or the like. The entity resolution component 470 may output data including an altered N-best list that is based on the cross-application N-best list represented in the cross-application N-best list data 460, and that includes more detailed information (e.g., entity IDs) about the specific entities mentioned in the slots and/or more detailed slot data that can eventually be used by an application 290. The NLU component 260 may include multiple entity resolution components 470 and each entity resolution component 470 may be specific to one or more applications 290.

The entity resolution component 470 may not be successful in resolving every entity and filling every slot represented in the N-best list represented in the cross-application N-best list data 460. This may result in the entity resolution component 470 outputting incomplete results. The NLU component 260 may include a preliminary ranker component 490. The preliminary ranker component 490 may assign a particular confidence score to each tagged text entry input therein. The confidence score of a tagged entry may represent a confidence of the system in the NLU processing performed with respect to the tagged entry. The confidence score of a particular tagged text entry may be affected by whether the tagged text entry has unfilled slots. For example, if a tagged text entry associated with a first application includes slots that are all filled/resolved, that tagged text entry may be assigned a higher confidence score than another tagged text entry including at least some slots that are unfilled/unresolved by the entity resolution component 470.

The preliminary ranker component 490 may apply re-scoring, biasing, or other techniques to determine the top scoring tagged text entries. To do so, the preliminary ranker component 490 may consider not only the data output by the entity resolution component 470, but may also consider other data 491. The other data 491 may include a variety of information. For example, the other data 491 may include application rating or popularity data. For example, if one application has a high rating, the preliminary ranker component 490 may increase the score of a tagged text entry output by a recognizer 363 associated with that application. The other data 491 may also include information about applications that have been enabled by the user that input the command to the system. For example, the preliminary ranker component 490 may assign higher scores to tagged text entries output by recognizers 363 associated with enabled applications than tagged text entries output by recognizers 363 associated with non-enabled applications. The other data 491 may also include data indicating user usage history, such as if the user that input the command to the system regularly uses a particular application or does so at particular times of day. The other data 491 may additionally include data indicating date, time, location, weather, type of device 110, user ID, context, as well as other information. For example, the preliminary ranker component 490 may consider when any particular application is currently active (e.g., music being played, a game being played, etc.).

Following preliminary ranking, the NLU component 260 may output NLU results data 485. The NLU component 260 may send the NLU results data 485 to the orchestrator component 230, which sends the NLU results data 485 to the post-result ranker component 265. The NLU results data 485 may include first NLU results data 485a including tagged text associated with a first application, second NLU results data 485b including tagged text associated with a second application, etc. The NLU results data 485 may include tagged text data corresponding to the top scoring tagged text entries as determined by the preliminary ranker component 490.

The orchestrator component 230 may send data output from the NLU component 260 to a post-result ranker component 265. The data 485 output from the NLU component 260 may include an N-best list of NLU results, where each item in the N-best list may correspond to a particular recognizer 363 and corresponding application 290. Thus, for example, first NLU results of the N-best list may be associated with a first application 290a, second NLU results of the N-best list may be associated with a second application 290b, third NLU results of the N-best list may be associated with a third application 290c, etc. Moreover, the first NLU results may correspond to text tagged to attribute meaning that enables the first application 290a to execute with respect to the first NLU results, the second NLU results may correspond to text tagged to attribute meaning that enables the second application 290b to execute with respect to the second NLU results, the third NLU results may correspond to text tagged to attribute meaning that enables the third application 290c to execute with respect to the third NLU results, etc. The data 485 may also include scores corresponding to each item in the N-best list. Alternatively, the NLU result data 485 output to a particular application 290 may include NER and IC data output by the particular application's recognizer 363 while the NLU result data 485 output to the post-result ranker component 265 may include only a portion of the NLU result data 485, for example the scores corresponding to certain applications.

The post-result ranker component 265 may include a statistical component that produces a ranked list of intent/application pairs with associated confidence scores. Each confidence score may indicate an adequacy of the application's execution of the intent with respect to NLU results associated with the application. The post-result ranker component 265 may operate one or more trained models that is configured to process NLU results data 485, application result data 430, and other data 420 in order to output ranker output data 425. The ranker output data 425 may include an N-best list where the items in the list are reordered from the N-best list 485 output from the NLU component 260 such that the N-best list in the ranker output data 425 represents a prioritized list of applications to respond to an input command as determined by the post-result ranker component 265. The ranker output data 425 may also include (either as part of an N-best list or otherwise) individual respective scores corresponding to applications 290 where each score indicates a probability that the application (and/or its respective result data) corresponds to the input command as represented in the text data 410.

The system may be configured with thousands, tens of thousands, etc. applications 290. The post-result ranker component 265 enables the system to better determine the best application 290 to execute the command input to the system. For example, first NLU results may correspond or substantially correspond to second NLU results, even though the first NLU results are operated on by a first application 290a and the second NLU results are operated on by a second application 290b. The first NLU results may be associated with a first confidence score indicating the system's confidence with respect to NLU processing performed to generate the first NLU results. Moreover, the second NLU results may be associated with a second confidence score indicating the system's confidence with respect to NLU processing performed to generate the second NLU results. The first confidence score may be similar or identical to the second confidence score since the first NLU results correspond or substantially correspond to the second NLU results. The first confidence score and/or the second confidence score may be a numeric value (e.g., from 0.0 to 1.0). Alternatively, the first confidence score and/or the second confidence score may be a binned value (e.g., low, medium, high).

The post-result ranker component 265 (or other scheduling component such as orchestrator component 230) may solicit the first application 290a and the second application 290b to provide potential result data 430 based on the first NLU results and the second NLU results, respectively. For example, the post-result ranker component 265 may send the first NLU results to the first application 290a along with a request for the first application 290a to at least partially execute a command with respect to the first NLU results. The post-result ranker component 265 may also send the second NLU results to the second application 290b along with a request for the second application 290b to at least partially execute a command with respect to the first NLU results. The post-result ranker component 265 receives, from the first application 290a, first result data 430a generated from the first application's execution with respect to the first NLU results. The post-result ranker component 265 also receives, from the second application 290b, second results data 430b generated from the second application's execution with respect to the second NLU results.

The result data 430 may include various components. For example, the result data 430 may include content (e.g., audio data, text data, and/or video data) to be output to a user. The result data 430 may also include a unique identifier (ID) used by the server(s) 120 and/or the application server(s) 125 to locate the data to be output to a user. The result data 430 may also include an instruction. For example, if the command corresponds to "turn on the light," the result data 430 may include an instruction causing the system to turn on a light associated with a profile of the device (110a/110b) and/or user.

The post-result ranker component 265 may consider the first result data 430a and the second result data 430b to alter the first confidence score and the second confidence score. That is, the post-result ranker component 265 may generate a third confidence score based on the first result data 430a and the first confidence score. That is, the third confidence score may correspond to how closely the post-result ranker component 265 determines the first application to correspond to the input text data 410 in view of not only the NLU result data 485, but also in view of the first application result data 430a. The post-result ranker component 265 may also generate a fourth confidence score based on the second result data 430b and the second confidence score. One skilled in the art will appreciate that a first difference between the third confidence score and the fourth confidence score may be greater than a second difference between the first confidence score and the second confidence score. The post-result ranker component 265 may also consider other data 420 (illustrated in and described with respect to FIG. 4) to generate the third confidence score and the fourth confidence score. While it has been described that the post-result ranker component 265 may alter the confidence scores associated with first and second applications, one skilled in the art will appreciate that the post-result ranker component 265 may alter the confidence scores of more than two applications. The post-result ranker component 265 may select the result data 430 associated with the application 290 with the highest altered confidence score to be the data output in response to the currently input command. The post-result ranker 265 may also consider the text data 410 to alter the NLU confidence scores of applications 290.

The model(s) of the post-result ranker component 265 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the post-result ranker component 265, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The orchestrator component 230 may, prior to sending the NLU results data 485 to the post-result ranker component 265, associate intents in the NLU results data 485 with applications 290. For example, if the NLU results data 485 includes a <PlayMusic> intent, the orchestrator component 230 may associate the NLU results data 485 with one or more applications 290 that can execute the <PlayMusic> intent. Thus, the orchestrator component 230 may send the NLU results data 485 paired with applications 290 to the post-result ranker component 265. In response to input text data corresponding to "what should I do for dinner today," the orchestrator component 230 may generates pairs of applications 290 with associated intents corresponding to:

Application 1/<Help>
Application 2/<Order>
Application 3/<DishType>

The NLU component 260 sends the NLU results data 485 to the post-result ranker component 265. The post-result ranker component 265 queries each application 290 paired with the NLU results data to provide result data 430 based on the NLU results data 485 and the intent associated therewith. That is, with respect to each application, the post-result ranker component 265 colloquially asks the each application "if given this intent and this NLU results data, what would you do with it." According to the above example, the post-result ranker component 265 may send applications 290 the following data:

Application 1: First NLU results data and <Help> intent indicator
Application 2: Second NLU results data and <Order> intent indicator
Application 3: Third NLU results data and <DishType> intent indicator The post-result ranker component 265 may request, in parallel or substantially in parallel, each of the applications 290, associated with the NLU results data 485, to provide result data 430.

An application 290 may provide the post-result ranker component 265 with various data and indications in response to the post-result ranker component 265 soliciting the application 290 for result data 430. An application 290 may simply provide the post-result ranker component 265 with an indication of whether or not the application can execute with respect to the NLU results data 485 and the intent. An application 290 may also or alternatively provide the post-result ranker component 265 with output data generated based on the NLU results data 485 and the intent. In some situations, an application 290 may need further information in addition to what is represented in the NLU results data 485 to provide output data responsive to the command. In these situations, the application 290 may provide the post-result ranker component 265 with result data 430 indicating slots of a framework that the application 290 further needs filled or entities that the application 290 further needs resolved prior to the application 290 being able to provided result data 430 responsive to the command. The application 290 may also provide the post-result ranker component 265 with an instruction and/or computer-generated speech indicating how the application 290 recommends the system solicit further information needed by the application 290. The application 290 may further provide the post-result ranker component 265 with an indication of whether the application 290 will have all needed information after the user 5 provides additional information a single time, or whether the application 290 will need the user 5 to provide various kinds of additional information prior to the application 290 having all needed information. According to the above example, applications 290 may provide the post-result ranker component 265 with the following:

Application 1: indication representing the application can execute with respect to the first NLU results and the <Help> intent indicator Application 2: indication representing the application needs to the system to further results an entity corresponding to "today"

Application 3: indication representing the application can provide numerous results in response to the third NLU results data and the <DishType> intent indicator "Output data" as used herein may refer to an indication provided by an application 290 indicating whether or not the application 290 can execute with respect to the NLU results data 485, data generated by an application 290 based on the NLU results data 485, as well as an indication provided by an application 290 indicating the application 290 needs further information in addition to what is represented in the NLU results data 485 to provide data responsive to the command.

The post-result ranker component 265 uses the result data 430 provided by the applications 290 to alter the NLU processing confidence scores generated by the preliminary ranker 490. That is, the post-result ranker component 265 uses the result data provided by the applications 290 to create larger differences between the NLU processing confidence scores generated by the preliminary ranker 490. Without the post-result ranker component 265, the system may not be confident enough to determine an output in response to a command, for example when the NLU results data associated with multiple applications are too close for the system to confidently determine a single application 290. For example, if the system does not implement the post-result ranker component 265, the system may not be able to determine whether to obtain output data from a general reference information application or a medical information application in response to a command corresponding to "what is acne."

The post-result ranker component 265 may prefer applications 290 that provide result data 430 responsive to the NLU results data 485 over applications 290 that provide result data 430 corresponding to an indication that further information is needed and applications 290 that provide result data 430 indicating they can provide multiple response to the NLU results data 485. For example, the post-result ranker component 265 may generate a post-result ranker score for a first application 290a that is greater than the first application's NLU confidence score based on the first application 290a providing result data 430a including a response to the NLU results data 485a and the intent associated with the first application 290a. For further example, the post-result ranker component 265 may generate a post-result ranker score for a second application 290b that is less than the second application's NLU confidence score based on the second application 290b providing result data 430b indicating further information is needed for the second application 290b to process provide a response to the NLU results data 485b associated with the second application 290b. Yet further, for example, the post-result ranker component 265 may generate a post-result ranker score for a third application 290c that is less than the third application's NLU confidence score based on the third application 290c providing result data 430c indicating it can provide multiple responses to the NLU results data 485c and the intent associated with the third application 290c The post-result ranker component 265 may also consider other data 420 in determining post-result ranker scores. The other data 420 may include rankings associated with the applications 290. A ranking may be a system ranking or a user specific ranking. A ranking may indicate a veracity of an application from the perspective of one or more users of the system. For example, the post-result ranker component 265 may generate a post-result ranker score for a first application 290a that is greater than the first application's NLU processing confidence score or previously generated post-result ranker score based on the first application 290a being associated with a high ranking. For further example, the post-result ranker component 265 may generate a post-result ranker score for a second application 290b that is less than the second application's NLU processing confidence score or previously generated post-result ranker score based on the second application 290b being associated with a low ranking.

The other data 420 may also include information indicating whether or not the user that originated the command has enabled one or more applications. For example, the post-result ranker component 265 may generate a post-result ranker score for a first application 290a that is greater than the first application's NLU processing confidence score or previously generated post-result ranker score based on the first application 290a being enabled by the user that originated the command. For further example, the post-result ranker component 265 may generate a post-result ranker score for a second application 290b that is less than the second application's NLU processing confidence score or previously generated post-result ranker score based on the second application 290b not being enabled by the user that originated the command.

A user may provide the system with indications of which skills are enabled (e.g., authorized to execute using data associated with the user). Such indications may be stored in the user profile storage 270. When the post-result ranker component 265 receives the text data NLU results data 485, the post-result ranker component 265 may determine whether profile data associated with the user and/or device that originated the command includes an indication of enabled skills.

The other data 420 may also include information indicating output capabilities of a device that will be used to output content responsive to the command to the user. The system may be configured with devices that include speakers but not displays, devices that include displays by not speakers, and devices that include speakers and displays. If the device that will output content responsive to the command includes one or more speakers but not a display, the post-result ranker component 265 may increase the NLU processing confidence score or previously generated post-result ranker score associated with a first application configured to output audible data (e.g., audio data and/or text data that may undergo text-to-speech processing) and/or decrease the NLU processing confidence score or previously generated post-result ranker score associated with a second application configured to output visual data (e.g., image data and/or video data). If the device that will output content responsive to the command includes a display but not one or more speakers, the post-result ranker component 265 may increase the NLU processing confidence score or previously generated post-result ranker score associated with a first application configured to output visual data and/or decrease the NLU processing confidence score or previously generated post-result ranker score associated with a second application configured to output audible data.

The other data 420 may also include information indicating the veracity of the output data provided by an application 290. For example, if a user says "tell me a recipe for pasta sauce," a first application 290a may provide the post-result ranker component 265 with first output data corresponding to a first recipe associated with a five (5) star rating and a second application 290b may provide the post-result ranker component 265 with second output data corresponding to a second recipe associated with a one (1) star rating. In this situation, the post-result ranker component 265 may increase the NLU processing confidence score or previously generated post-result ranker score associated with the first application 290a based on the first application 290a providing the first output data associated with the five (5) star rating and/or decrease the NLU processing confidence score or previously generated post-result ranker score associated with the second application 290b based on the second application 290b providing the second output data associated with the one (1) star rating.

The other data 420 may also include information indicating the type of device that originated the command. For example, the device may correspond to a "hotel room" type if the device is located in a hotel room. If a user inputs a command corresponding to "order me food" to the device located in the hotel room, the post-result ranker component 265 may increase the NLU processing confidence score or previously generated post-result ranker score associated with a first application 290a corresponding to a room service application associated with the hotel and/or decrease the NLU processing confidence score or previously generated post-result ranker score associated with the second application 290b corresponding to a food application not associated with the hotel.

The other data 420 may also include information indicating a location of the device and/or user that originated the command. The system may be configured with applications 290 that may only operate with respect to certain geographic locations. For example, a user may input a command corresponding to "when is the next train to Portland." A first application 290a may operate with respect to trains that arrive at, depart from, and pass through Portland, Oreg. A second application 290b may operate with respect to trains that arrive at, depart from, and pass through Portland, Me. If the device and/or user that originated the command is located in Seattle, Wash., the post-result ranker component 265 may increase the NLU processing confidence score or previously generated post-result ranker score associated with the first application 290a and/or decrease the NLU processing confidence score or previously generated post-result ranker score associated with the second application 290b. Likewise, if the device and/or user that originated the command is located in Boston, Mass., the post-result ranker component 265 may increase the NLU processing confidence score or previously generated post-result ranker score associated with the second application 290b and/or decrease the NLU processing confidence score or previously generated post-result ranker score associated with the first application 290a.

The other data 420 may also include information indicating a time of day. The system may be configured with applications 290 that operate with respect to certain times of day. For example, a user may input a command corresponding to "order me food." A first application 290a may generate first output data corresponding to breakfast. A second application 290b may generate second output data corresponding to dinner. If the user inputs the command in the morning, the post-result ranker component 265 may increase the NLU processing confidence score or previously generated post-result ranker score associated with the first application 290a and/or decrease the NLU processing score or previously generated post-result ranker score associated with the second application 290b. If the user inputs the command in the afternoon or evening, the post-result ranker component 265 may increase the NLU processing confidence score or previously generated post-result ranker score associated with the second application 290b and/or decrease the NLU processing confidence score or previously generated post-result ranker score associated with the first application 290a.

The other data 420 may also include information indicating user preferences. The system may include multiple applications 290 configured to execute in substantially the same manner. For example, a first application 290a and a second application 290b may both be configured to order food from respective restaurants. The system may store a user preference (e.g., in the user profile storage 270) that is associated with the user that input the command to the system as well as indicates the user prefers the first application 290a over the second application 290b. Thus, when the user inputs a command that may be executed by both the first application 290a and the second application 290b, the post-result ranker component 265 may increase the NLU processing confidence score or previously generated post-result ranker score associated with the first application 290a and/or decrease the NLU processing confidence score or previously generated post-result ranker score associated with the second application 290b.

The other data 420 may also include information indicating system usage history associated with the user that input the command to the system. For example, the system usage history may indicate the user inputs commands that invoke a first application 290a more often than the user inputs that invoke a second application 290b. Based on this, if a presently input command originating from the user may be executed by both the first application 290a and the second application 290b, the post-result ranker component 265 may increase the NLU processing confidence score or previously generated post-result ranker score associated with the first application 290a and/or decrease the NLU processing confidence score or previously generated post-result ranker score associated with the second application 290b.

The other data 420 may also include information indicating a speed at which the device 110 that originated the command is traveling. For example, the device 110 may be located in a moving vehicle, or may be a moving vehicle. When a device 110 is in motion, the system may be configured to prefer audible outputs rather than visual outputs to decrease the likelihood of distracting a driver of a vehicle. Thus, for example, if the device 110 that originated the command is moving at or above a threshold speed (e.g., a speed above an average user's walking speed), the post-result ranker component 265 may increase the NLU processing confidence score or previously generated post-result ranker score associated with a first application 290a that generates output audio data or output text data that can be converted into output audio data using text-to-speech processing. The post-result ranker component 265 may also or alternatively decrease the NLU processing confidence score or previously generated post-result ranker score associated with a second application 290b that generates output image data or output video data.

The other data 420 may also include information indicating how long it took an application to provide output data to the post-result ranker component 265. When the post-result ranker component 265 requests output data from multiple applications 290, the applications 290 may respond to the requests at different speeds. The post-result ranker component 265 may implement a latency budget. For example, if the post-result ranker component 265 determines an application 290 responds to the post-result ranker component 265 within a threshold amount of time from receiving a request from the post-result ranker component 265, the post-result ranker component 265 may increase the NLU processing confidence score or previously generated post-result ranker score associated with the application 290. Conversely, if the post-result ranker component 265 determines an application 290 does not respond to the post-result ranker component 265 within a threshold amount of time from receiving a request from the post-result ranker component 265, the post-result ranker component 265 may decrease the NLU processing confidence score or previously generated post-result ranker score associated with the application 290.

It has been described that the post-result ranker component 265 uses the other data 420 to increase and decrease post-result ranker scores associated with various applications that the post-result ranker component 265 has already requested output data from. Alternatively, the post-result ranker component 265 may use the other data 420 to determine which applications 290 to request output data from. For example, the post-result ranker component 265 may use the other data 420 to increase and/or decrease NLU processing confidence scores associated with applications 290 associated with the NLU results data 485 output by the NLU component 260. The post-result ranker component 265 may select N number of top scoring altered NLU processing confidence scores. The post-result ranker component 265 may then request result data 430 from only the applications 290 associated with the selected N number of NLU processing confidence scores.

As described, the post-result ranker component 265 may request result data 430 from all applications 290 associated with the NLU results data 485 output by the NLU component 260. Alternatively, the system may be configured to prefer result data 430 from 1P applications over 3P applications. Therefore, in the first instance, the post-result ranker component 265 may request result data 430 from only 1P applications associated with the NLU results data 485. The post-result ranker component 265 may only request result data 430 from 3P applications associated with the NLU results data 485 if none of the 1P applications provide the post-result ranker component 265 with result data 430 indicating either data response to the NLU results data 485, an indication that the 1P application can execute the command, or an indication that further information is needed.

As indicated above, the post-result ranker component 265 may request result data 430 from multiple applications 290. If one of the applications 290 provides result data 430 indicating a response to the NLU results data 485 and the other applications provide result data 430 indicating either they cannot execute or they need further information, the post-result ranker component 265 may select the application 290 that provided the result data 430 including the response to the NLU results data 485 as the data to be output to the user. If more than one of the applications 290 provides result data 430 indicating responses to the NLU results data 485, the post-result ranker component 265 may consider the other data 420 to generate post-result ranker scores, and select the result data 430 of the application associated with the greatest post-result ranker score as the data to be output to the user.

A system that does not implement the post-result ranker component 265 may select the highest scored preliminary ranked NLU results data 485 associated with a single application. The system may send the NLU results data 485 to the application 290 along with a request for output data. In some situations, the application 290 may not be able to provide the system with output data. This results in the system indicating to the user that the command could not be processed even though another application associated with lower ranked NLU results data 485 could have provided output data responsive to the command.

The post-result ranker component 265 eliminates, or nearly eliminates, the aforementioned situation. As described, the post-result ranker component 265 requests multiple applications associated with the NLU results data 485 to provide result data 430 to the post-result ranker component 265 prior to the post-result ranker component 265 ultimately determining the application 290 to provide content to the user. Some of the applications 290 may provide result data 430 indicating a response to the NLU results data 485 while other applications 290 may providing result data 430 indicating they cannot provide data response. Whereas a system not implementing the post-result ranker component 265 may select one of the applications 290 that could not provide a response, the post-result ranker component 265 only selects an application 290 that provides the post-result ranker component 265 with result data corresponding to a response, indicating further information is needed, or indicating multiple responses can be generated.

The post-result ranker component 265 may select result data 430 associated with the application 290 associated with the highest post-result ranker score for output to the user. Alternatively, the post-result ranker component 265 may output ranker output data 425 indicating applications 290 and their respective post-NLU rankings. Since the post-result ranker component 265 receives result data 430, potentially corresponding to a response to the command, from the applications 290 and prior to post-result ranker component 265 selecting one of the applications or outputting the ranker output data 425, little to no latency occurs from the time applications provide result data 430 to the post-result ranker component 265 and the time the system outputs content to the user.

If the post-result ranker component 265 selects result audio data to be output to a user and the system determines content should be output audibly, the post-result ranker component 265 (or another component of the server(s) 120) may cause the device 110a and/or the device 110b to output audio corresponding to the result audio data. If the post-result ranker component 265 selects result text data to output to a user and the system determines content should be output visually, the post-result ranker component 265 (or another component of the server(s) 120) may cause the device 110b to display text corresponding to the result text data. If the post-result ranker component 265 selects result audio data to output to a user and the system determines content should be output visually, the post-result ranker component 265 (or another component of the server(s) 120) sends the result audio data to the ASR component 250. The ASR component 250 generates output text data corresponding to the result audio data. The server(s) 120 then causes the device 110b to display text corresponding to the output text data. If the post-result ranker component 265 selects result text data to output to a user and the system determines content should be output audibly, the post-result ranker component 265 (or another component of the server(s) 120) sends the result text data to a text-to-speech component 280 of the server(s) 120. The text-to-speech component 280 may generate output audio data (corresponding to computer-generated speech) based on the result text data. The server(s) 120 then causes the device 110a and/or the device 110b to output audio corresponding to the output audio data.

As described, an application 290 may provide result data 430 either indicating a response to the command, indicating more information is needed for the application 290 to provide a response to the command, or indicating the application 290 cannot provide a response to the command. If the application 290 associated with the highest post-result ranker score provides the post-result ranker component 265 with result data 430 indicating a response to the command, the post-result ranker component 265 (or another component of the server(s) 120, such as the orchestrator component 230) may simply cause content corresponding to the result data 430 to be output to the user. For example, the post-result ranker component 265 may send the result data 430 to the orchestrator component 230. The orchestrator component 230 may cause the result data 430 to be sent to the device (110a/110b), which may output audio and/or display text corresponding to the result data 430. The orchestrator component 230 may send the result data 430 to the ASR component 250 to generate output text data and/or may send the result data 430 to the text-to-speech component 280 to generate output audio data, depending on the situation.

The application 290 associated with the highest post-result ranker score may provide the post-result ranker component 265 with result data 430 indicating more information is needed as well as instruction data. The instruction data may indicate how the application 290 recommends the system obtain the needed information. For example, the instruction data may correspond to text data or audio data (i.e., computer generated speech) corresponding to "please indicate _____." The instruction data may be in a format (e.g., text data or audio data) capable of being output by the device (110a/110b). When this occurs, the post-result ranker component 265 may simply cause the received instruction data be output by the device (110a/110b). Alternatively, the instruction data may be in a format that is not capable of being output by the device (110a/110b). When this occurs, the post-result ranker component 265 may cause the ASR component 250 or the text-to-speech component 280 to process the instruction data, depending on the situation, to generate instruction data that may be output by the device (110a/110b). Once the user provides the system with all further information needed by the application 290, the application 290 may provide the system with result data 430 indicating a response to the command, which may be output by the system as detailed above.

The system may include "informational" applications 290 that simply provide the system with information, which the system outputs to the user. The system may also include "transactional" applications 290 that require a system instruction to execute the command. Transactional applications 290 include ride sharing applications, flight booking applications, etc. A transactional application 290 may simply provide the post-result ranker component 265 with result data 430 indicating the transactional application 290 can execute the command. The post-result ranker component 265 may then cause the system to solicit the user for an indication that the system is permitted to cause the transactional application 290 to execute the command. The user provided indication may be an audible indication or a tactile indication (e.g., activation of a virtual button or input of text via a virtual keyboard). In response to receiving the user provided indication, the system may provide the transactional application 290 with data corresponding to the indication. In response, the transactional application 290 may execute the command (e.g., book a flight, book a train ticket, etc.). Thus, while the system may not further engage an informational application 290 after the informational application 290 provides the post-result ranker component 265 with result data 430, the system may further engage a transactional application 290 after the transactional application 290 provides the post-result ranker component 265 with result data 430 indicating the transactional application 290 may execute the command.

In some instances, the post-result ranker component 265 may generate respective scores for first and second applications that are too close (e.g., are not different by at least a threshold difference) for the post-results ranker component 265 to make a confident determination regarding which application should execute the input command. When this occurs, the system may solicit the user 5 regarding which application the user prefers to execute the input command. The system may output TTS generated speech to the user to solicit which application the user wants to execute the input command.

Figure 5:
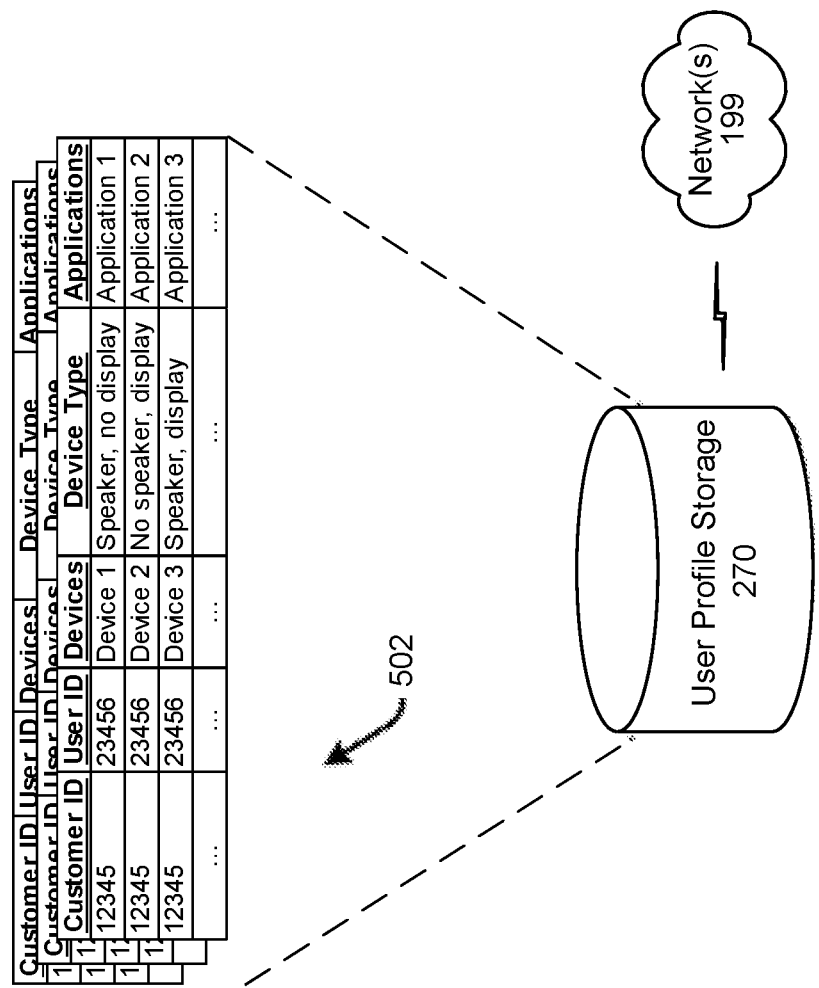
FIG. 5 illustrates data stored and associated with user profiles according to embodiments of the present disclosure.

FIG. 5 illustrates the user profile storage 270 that includes data regarding customer profiles as well as individual user profiles 502. Each user profile 502 may include information indicating various devices, output capabilities of each of the various devices, and enabled applications. Each user profile 502 may additionally include other data not explicitly illustrated.

Figure 6:
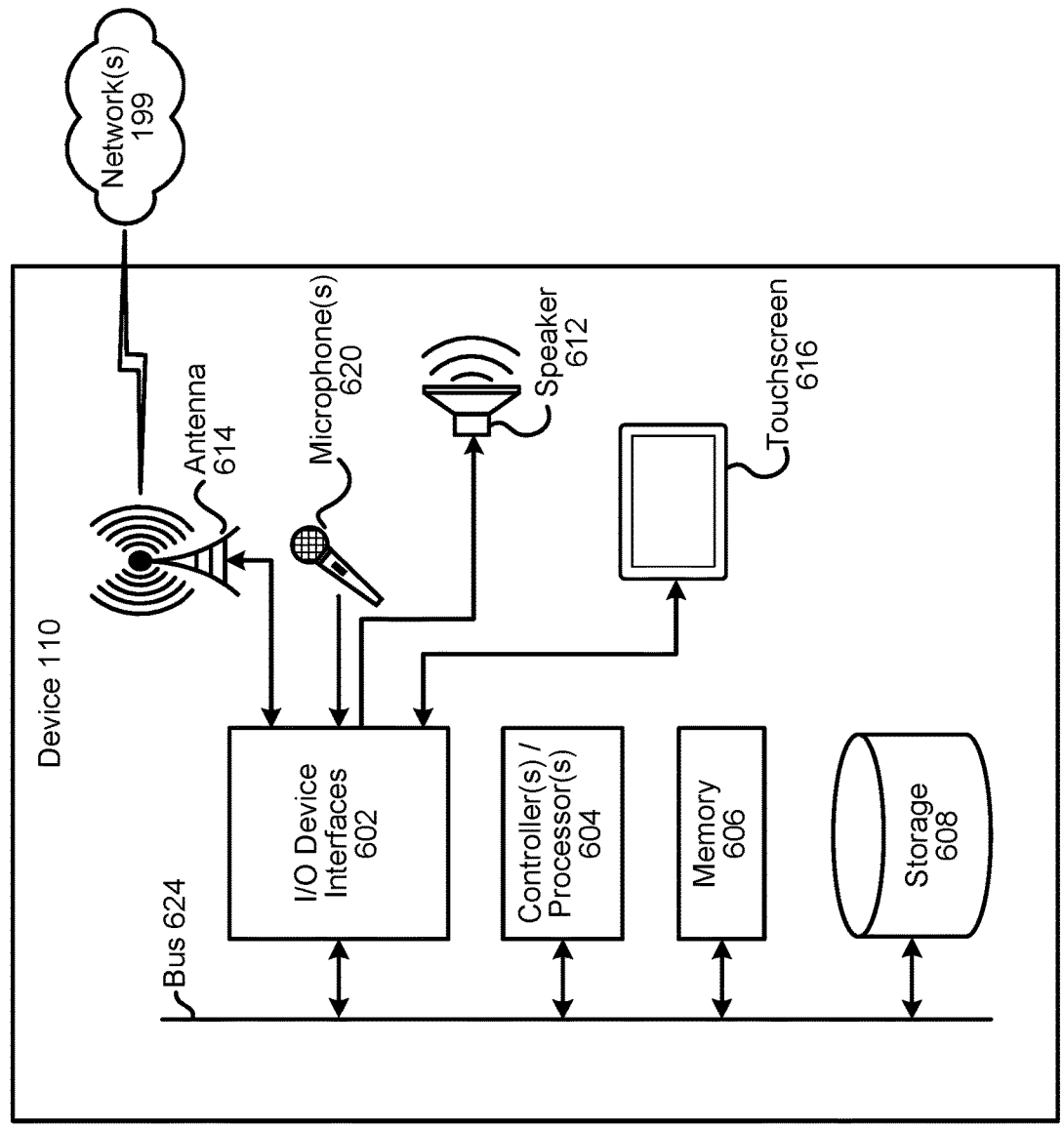
FIG. 6 is a block diagram conceptually illustrating example components of a device according to embodiments of the present disclosure.
Figure 7:
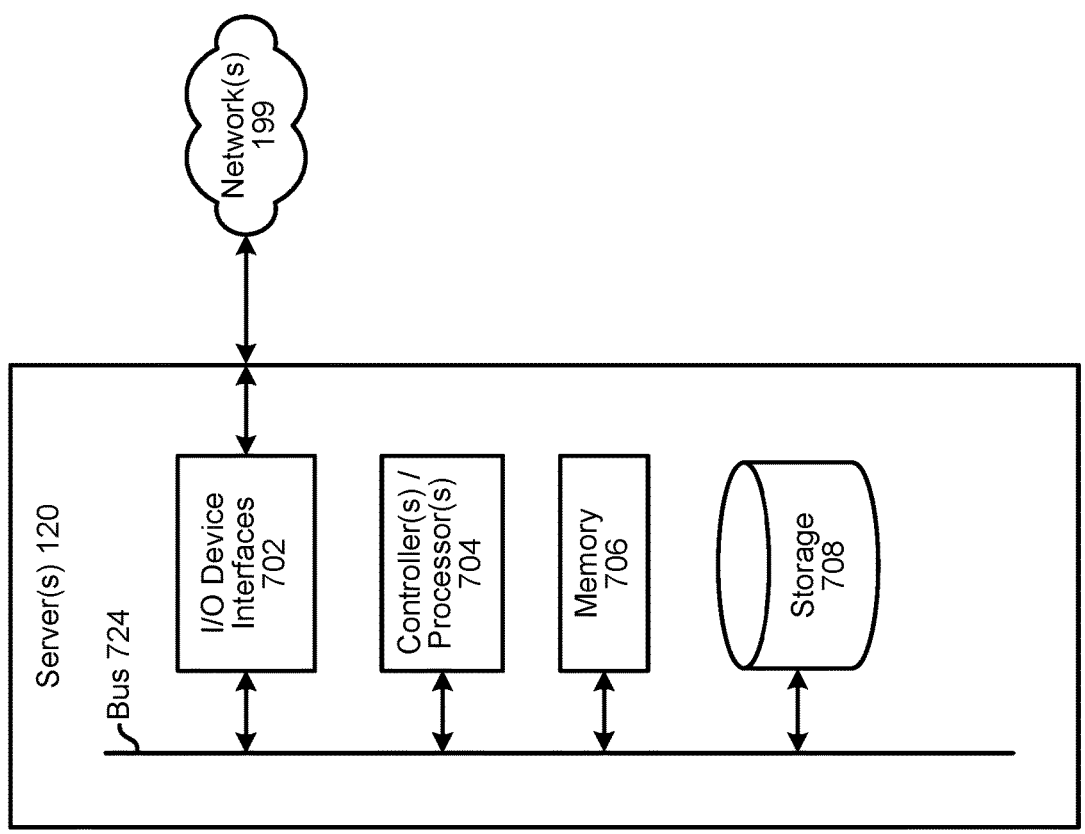
FIG. 7 is a block diagram conceptually illustrating example components of a server according to embodiments of the present disclosure.

FIG. 6 is a block diagram conceptually illustrating a user device 110 that may be used with the system. FIG. 7 is a block diagram conceptually illustrating example components of a remote device, such as the server(s) 120, which may assist with ASR processing, NLU processing, or command processing. Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120) may also include a data storage component (608/708) for storing data and controller/processor-executable instructions. Each data storage component (608/708) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (602/702).

Computer instructions for operating each device (110/120) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120) includes input/output device interfaces (602/702). A variety of components may be connected through the input/output device interfaces (602/702), as will be discussed further below. Additionally, each device (110/120) may include an address/data bus (624/724) for conveying data among components of the respective device. Each component within a device (110/120) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (602/702) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (602/702), processor(s) (604/704), memory (606/706), and/or storage (608/708) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

Figure 8:
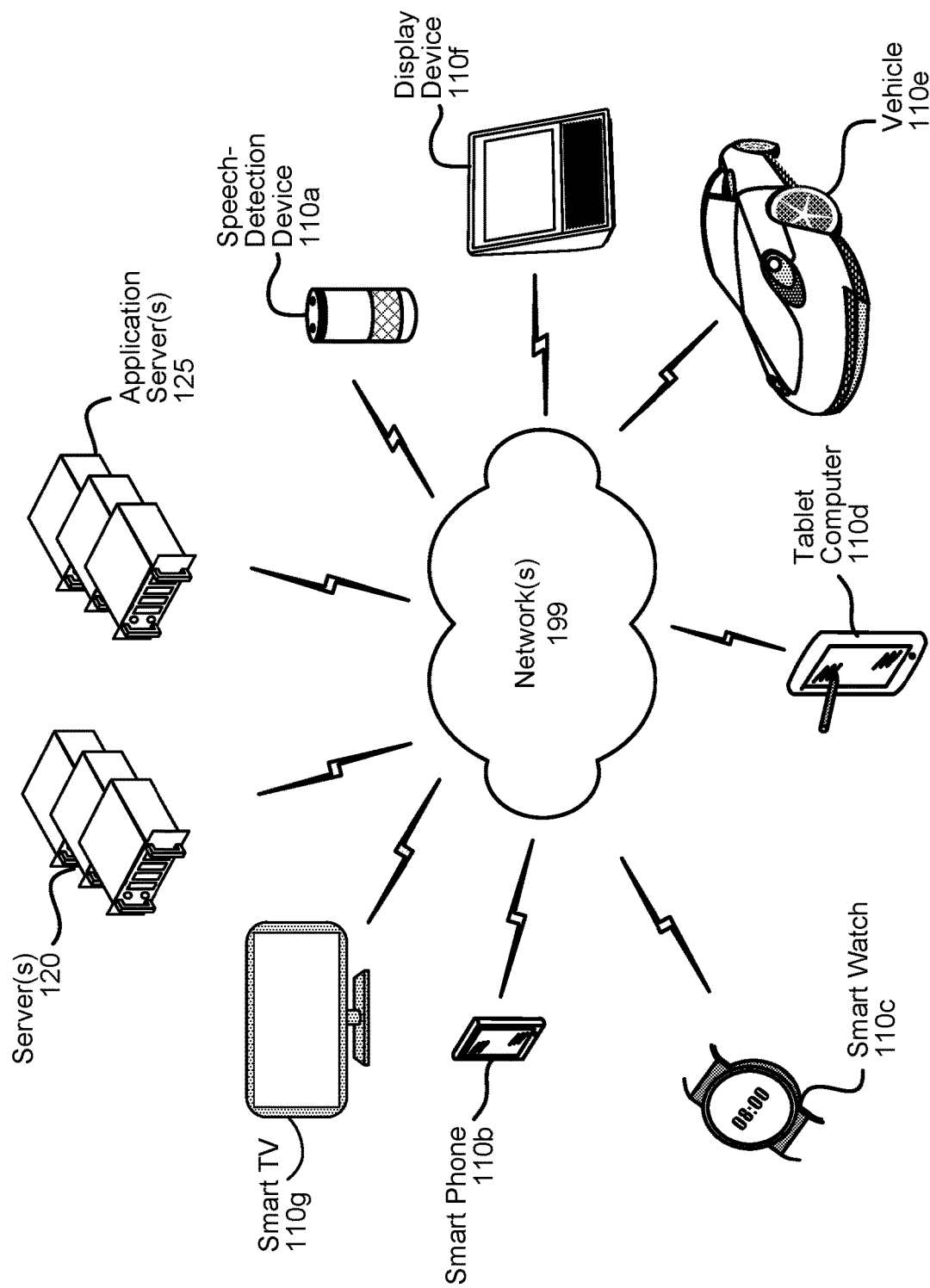
FIG. 8 illustrates an example of a computer network for use with the speech processing system.

As illustrated in FIG. 8, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart TV 110g may be connected to the network(s) 199 through a wireless service provider, over a WiFi or cellular network connection, or the like. Other devices are included as network-connected support devices, such as the server(s) 120, application server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a device, input audio data corresponding to an utterance representing a command;
   performing automatic speech recognition (ASR) processing on the input audio data to generate input text data;
   performing natural language understanding (NLU) processing on the input text data to generate:
      first NLU data associated with a first application,
      a first confidence score indicating a confidence of NLU processing performed to generate the first NLU data,
      second NLU data associated with a second application, and
      a second confidence score indicating a confidence of NLU processing performed to generate the second NLU data;
   receiving, from the first application, first output data generated based at least in part on the first NLU data;
   receiving, from the second application, second output data generated based at least in part on the second NLU data;
   determining a third confidence score based at least in part on the first confidence score and the first output data;
   determining a fourth confidence score based at least in part on the second confidence score and the second output data;
   determining the third confidence score is greater than the fourth confidence score; and
   based at least in part on the third confidence score being greater than the fourth confidence score, sending, to the device, at least a portion of the first output data.

2. The computer-implemented method of claim 1, further comprising:
   receiving second input text data corresponding to a second command;
   performing NLU processing on the second input text data to generate:
      third NLU data associated with a third application,
      a fifth confidence score indicating a confidence of NLU processing performed to generate the third NLU data,
      fourth NLU data associated with a fourth application, and
      a sixth confidence score indicating a confidence of NLU processing performed to generate the fourth NLU data;
   receiving, from the third application, third output data generated based at least in part on the third NLU data;
   receiving, from the fourth application a first indication that more information is needed for the fourth application to execute the second command;
   determining a seventh confidence score based at least in part on the fifth confidence score and the third output data;
   determining an eighth confidence score based at least in part on the sixth confidence score and the first indication;
   determining the seventh confidence score is greater than the eighth confidence score; and
   based at least in part on the seventh confidence score being greater than the eighth confidence score, sending, to the device, at least a portion of the third output data.

3. The computer-implemented method of claim 1, further comprising:
   receiving, from the device, a signal indicating the first application is authorized to execute with respect to data received from the device;
   storing profile data representing the first application is authorized to execute with respect to data received from the device; and
   after performing NLU processing, determining the profile data represents the first application is authorized to execute with respect to data received from the device,
   wherein the third confidence score is further determined based at least in part on determining the profile data represents the first application is authorized to execute with respect to data received from the device.

4. The computer-implemented method of claim 1, further comprising:
   receiving second input text data corresponding to a second command;
   performing NLU processing on the second input text data to generate:
      third NLU data associated with a third application,
      a fifth confidence score indicating a confidence of NLU processing performed to generate the third NLU data, fourth NLU data associated with a fourth application, and
a sixth confidence score indicating a confidence of NLU processing performed to generate the fourth NLU data;
receiving, from the third application, third output data generated based at least in part on the third NLU data;
receiving, from the fourth application, a first indication that more information is needed for the fourth application to execute the second command;
determining a seventh confidence score based at least in part on the fifth confidence score and the third output data;
determining an eighth confidence score based at least in part on the sixth confidence score and the first indication;
determining a first difference between the seventh confidence score and the eighth confidence score;
determining the first difference is less than a threshold difference; and
based at least in part on the first difference being less than the threshold difference, causing the device to output content soliciting which of the third application or the fourth application is to execute the second command.

5. A system comprising:
at least one processor; and
at least one memory including instructions that, when executed by the at least one processor, cause the system to:
receive, from a device, input data corresponding a command;
determine first natural language understanding (NLU) data associated with the input data and a first application;
determine a first score corresponding to the first NLU data;
determine second NLU data associated with the input data and a second application;
determine a second score corresponding to the second NLU data;
receive, from the first application, first output data;
receive, from the second application, second output data;
determine a third score based at least in part on the first score and the first output data;
determine a fourth score based at least in part on the second score and the second output data; and
based at least in part on the third score and the fourth score, cause the device to output content corresponding to at least a portion of the first output data.

6. The system of claim 5, wherein the at least one memory further includes instructions that, when executed by the at least one processor, further cause the system to:
receive, from the device, second input data corresponding to a second command;
determine third NLU data associated with the second input data and a third application;
determine fourth NLU data associated with the second input data and a fourth application;
determine a fifth score corresponding to the third NLU data;
determine a sixth score corresponding to the fourth NLU data;
receive, from the third application, third output data;
receive, from the fourth application, a first indication that more information is needed for the fourth application to execute the second command;
determine a seventh score based at least in part on the fifth score and the third output data;
determine an eighth score based at least in part on the sixth score and the first indication; and
based at least in part on the seventh score and the eighth score, send, to the device, at least a portion of the third output data.

7. The system of claim 5, wherein the at least one memory further includes instructions that, when executed by the at least one processor, further cause the system to:
determine a ranking associated with the first application, the ranking indicating an adequateness of data output by the first application,
wherein
the third score is further determined based at least in part on the ranking.

8. The system of claim 5, wherein the at least one memory further includes instructions that, when executed by the at least one processor, further cause the system to:
determine profile data represents the first application is authorized to execute with respect to data received from the device,
wherein the third score is further determined based at least in part on determining the profile data represents the first application is authorized to execute with respect to data received from the device.

9. The system of claim 5, wherein the at least one memory further includes instructions that, when executed by the at least one processor, further cause the system to:
determine third NLU data associated with the input data and a third application;
determine a fifth score corresponding to the third NLU data;
determine context data associated with the device, the context data representing at least one of a location of the device or a speed of motion of the device; and
determine, based at least in part on the context data, to:
send the first NLU data to the first application,
send the second NLU data to the second application, and
refrain from sending the third NLU data to the third application.

10. The system of claim 5, wherein the at least one memory further includes instructions that, when executed by the at least one processor, further cause the system to:
determine a geographic location of the device,
wherein the third score is further determined based at least in part on the geographic location.

11. The system of claim 5, wherein the at least one memory further includes instructions that, when executed by the at least one processor, further cause the system to:
determine a processing history associated with the first application,
wherein
the third score is further determined based at least in part on the processing history.

12. The system of claim 5, wherein the at least one memory further includes instructions that, when executed by the at least one processor, further cause the system to:
determine a length of time between sending the first NLU data to the first application and receiving the first output data,
wherein
the third score is further determined based at least in part on the length of time.

13. A computer-implemented method comprising:
receiving, from a device, input data corresponding a command;
determining first natural language understanding (NLU) data associated with the input data and a first application;
determining a first score corresponding to the first NLU data;
determining second NLU data associated with the input data and a second application;
determining a second score corresponding to the second NLU data;
receiving, from the first application, first output data;
receiving, from the second application, second output data;
determining a third score based at least in part on the first score and the first output data;
determining a fourth score based at least in part on the second score and the second output data; and
based at least in part on the third score and the fourth score, causing the device to output content corresponding to at least a portion of the first output data.

14. The computer-implemented method of claim 13, further comprising receiving, from the device, second input data corresponding to a second command;
determining third NLU data associated with the second input data and a third application;
determining fourth NLU data associated with the second input data and a fourth application;
determining a fifth score corresponding to the third NLU data;
determining a sixth score corresponding to the fourth NLU data;
receiving, from the third application, third output data;
receiving, from the fourth application, a first indication that more information is needed for the fourth application to execute the second command;
determining a seventh score based at least in part on the fifth score and the third output data;
determining an eighth score based at least in part on the sixth score and the first indication; and
based at least in part on the seventh score and the eighth score, sending, to the device, at least a portion of the third output data.

15. The computer-implemented method of claim 13, further comprising:
determining a ranking associated with the first application, the ranking indicating an adequateness of data output by the first application,
wherein
the third score is further determined based at least in part on the ranking.

16. The computer-implemented method of claim 13, further comprising:
determining profile data represents the first application is authorized to execute with respect to data received from the device,
wherein the third score is further determined based at least in part on determining the profile data represents the first application is authorized to execute with respect to data received from the device.

17. The computer-implemented method of claim 13, further comprising:
determining third NLU data associated with the input data and a third application;
determining a fifth score corresponding to the third NLU data;
determining context data associated with the device, the context data representing at least one of a location of the device or a speed of motion of the device; and
determining, based at least in part on the context data, to:
send the first NLU data to the first application,
send the second NLU data to the second application, and
refrain from sending the third NLU data to the third application.

18. The computer-implemented method of claim 13, further comprising:
determining a geographic location of the device,
wherein the third score is further determined based at least in part on the geographic location.

19. The computer-implemented method of claim 13, further comprising:
determining a processing history associated with the first application,
wherein
the third score is further determined based at least in part on the processing history.

20. The computer-implemented method of claim 13, further comprising:
determining a length of time between sending the first NLU data to the first application and receiving the first output data,
wherein
the third score is further determined based at least in part on the length of time.

* * * * *